(12) United States Patent
Ahmed

(10) Patent No.: US 12,465,907 B1
(45) Date of Patent: Nov. 11, 2025

(54) FABRICATION OF PbO/Co$_3$O$_4$/MgO NANOCOMPOSITE MATERIAL USING PECHINI SOL-GEL METHOD

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

(21) Appl. No.: 19/039,906

(22) Filed: Jan. 29, 2025

(51) Int. Cl.
| | |
|---|---|
| *B01J 23/835* | (2006.01) |
| *B01J 23/75* | (2006.01) |
| *B01J 35/00* | (2006.01) |
| *B01J 35/30* | (2024.01) |
| *B01J 35/45* | (2024.01) |
| *B01J 35/51* | (2024.01) |
| *B01J 35/55* | (2024.01) |
| *B01J 37/04* | (2006.01) |
| *B01J 37/08* | (2006.01) |
| *B01J 37/12* | (2006.01) |

(52) U.S. Cl.
CPC ............ *B01J 23/835* (2013.01); *B01J 23/75* (2013.01); *B01J 35/19* (2024.01); *B01J 35/393* (2024.01); *B01J 35/45* (2024.01); *B01J 35/51* (2024.01); *B01J 35/55* (2024.01); *B01J 37/04* (2013.01); *B01J 37/08* (2013.01); *B01J 37/12* (2013.01)

(58) Field of Classification Search
CPC . B01J 23/835; B01J 35/45; B01J 35/51; B01J 35/19; B01J 35/393; B01J 35/55; B01J 23/75; B01J 37/04; B01J 37/08; B01J 37/12
See application file for complete search history.

(56) References Cited

U.S. PATENT DOCUMENTS

2009/0148347 A1   6/2009   Lee et al.

FOREIGN PATENT DOCUMENTS

| CN | 104752069 B | 10/2018 |
| EP | 0714850 81 | 7/1999 |

OTHER PUBLICATIONS

Mosab Kaseema. et al., "Electrochemical response of MgO/Co3O4 oxide layers produced by plasma electrolytic oxidation and post treatment using cobalt nitrate", Journal of Magnesium and Alloys, vol. 11, Issue 3, Mar. 2023, pp. 1057-1073, 17 Pages.

Grigory B. Veselov, et al., "Sol-gel prepared Co—Mg—O oxide systems: redox behavior, thermal stability and catalytic performance in CO oxidation", Reaction Kinetics, Mechanisms and Catalysis, vol. 136, 2023, p. 233-250, 18 Pages.

*Primary Examiner* — James A Fiorito
(74) *Attorney, Agent, or Firm* — Oblon, McClelland, Maier & Neustadt, L.L.P.

(57) ABSTRACT

A PbO/Co$_3$O$_4$/MgO nanocomposite material includes an orthorhombic PbO crystalline phase, a cubic Co$_3$O$_4$ crystalline phase, and a cubic MgO crystalline phase. The average crystallite size of the PbO/Co$_3$O$_4$/MgO nanocomposite material is in a range from 75 to 90 nm.

20 Claims, 5 Drawing Sheets

FABRICATION OF PbO/Co₃O₄/MgO NANOCOMPOSITE MATERIAL USING PECHINI SOL-GEL METHOD

BACKGROUND

Technical Field

The present disclosure is directed to nanocomposites, more particularly, to PbO/Co$_3$O$_4$/MgO nanocomposites fabricated using Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The present disclosure builds upon prior advancements in material science, particularly in the synthesis and applications of multi-component oxide nanocomposites. Existing research studies have extensively explored the use of single-metal oxides such as lead oxide, cobalt oxide, and magnesium oxide in various applications like catalysis and environmental remediation.

However, these studies often highlight limitations, including low thermal stability, inadequate active site availability, and limited reusability of the materials. While the Pechini sol-gel method has been widely utilized for synthesizing homogeneous oxide materials, its potential for creating multiphase nanocomposites with enhanced properties has not been fully explored. Related art has demonstrated the effectiveness of individual oxides in specific applications, but the integration of lead oxide, cobalt oxide, and magnesium oxide into a single nanocomposite that addresses the shortcomings of the single-metal oxide system is not disclosed.

Accordingly, an object of the present disclosure is directed to a PbO/Co$_3$O$_4$/MgO nanocomposite, fabricated using a modified Pechini sol-gel method, that combines the high adsorption efficiency of PbO, the catalytic activity of Co$_3$O$_4$, and the thermal stability of MgO into a single material with enhanced performance characteristics.

SUMMARY

In an exemplary embodiment, a PbO/Co$_3$O$_4$/MgO nanocomposite material is described. The PbO/Co$_3$O$_4$/MgO nanocomposite material includes an orthorhombic PbO crystalline phase, a cubic Co$_3$O$_4$ crystalline phase, and a cubic MgO crystalline phase. The average crystallite size of the PbO/Co$_3$O$_4$/MgO nanocomposite material is in a range from 75 to 90 nm.

In some embodiments, the average crystallite size of the PbO/Co$_3$O$_4$/MgO nanocomposite material is in a range from 78 to 85 nm.

In some embodiments, the average crystallite size of the PbO/Co$_3$O$_4$/MgO nanocomposite material is in a range from 81 to 83 nm.

In some embodiments, the atomic concentration of lead in the PbO/Co$_3$O$_4$/MgO nanocomposite material is in a range from 8 to 15 atomic % (at. %) of the total number of atoms, the atomic concentration of cobalt in the PbO/Co$_3$O$_4$/MgO nanocomposite material is in a range from 15 to 25 at. % of the total number of atoms, and the atomic concentration of magnesium in the PbO/Co$_3$O$_4$/MgO nanocomposite material is in a range from 14 to 22 at. % of the total number of atoms.

In some embodiments, the atomic concentration of lead in the PbO/Co$_3$O$_4$/MgO nanocomposite material is in a range from 10 to 13 at. % of the total number of atoms, the atomic concentration of cobalt in the PbO/Co$_3$O$_4$/MgO nanocomposite material is in a range from 18 to 22 at. % of the total number of atoms, and the atomic concentration of magnesium in the PbO/Co$_3$O$_4$/MgO nanocomposite material is in a range from 16 to 20 at. % of the total number of atoms.

In some embodiments, the atomic concentration of lead in the PbO/Co$_3$O$_4$/MgO nanocomposite material is in a range from 11 to 12 at. % of the total number of atoms, the atomic concentration of cobalt in the PbO/Co$_3$O$_4$/MgO nanocomposite material is in a range from 19 to 21 at. % of the total number of atoms, and the atomic concentration of magnesium in the PbO/Co$_3$O$_4$/MgO nanocomposite material is in a range from 17 to 18.5 at. % of the total number of atoms.

In some embodiments, the atomic concentration of oxygen in the PbO/Co$_3$O$_4$/MgO nanocomposite material is in a range from 40 to 60 at. % of the total number of atoms.

In some embodiments, the PbO/Co$_3$O$_4$/MgO nanocomposite material includes a heterogenous structure which further includes rod-like particles with an average length in a range from 0.5 to 10 μm and an average diameter in a range from 0.25 to 4 μm; and agglomerations of spherical particles wherein the spherical particles have an average diameter in a range from 10 to 300 nm.

In some embodiments, the PbO/Co$_3$O$_4$/MgO nanocomposite material includes a heterogenous structure which further includes rod-like particles with an average length in a range from 1 to 5 μm and an average diameter in a range from 0.25 to 2.0 μm; and agglomerations of spherical particles wherein the spherical particles have an average diameter in a range from 25 to 200 nm.

In some embodiments, the PbO/Co$_3$O$_4$/MgO nanocomposite material includes a heterogenous structure which further includes rod-like particles with an average length in a range from 1 to 3 μm and an average diameter in a range from 0.5 to 1.5 μm; and agglomerations of spherical particles wherein the spherical particles have an average diameter in a range from 25 to 200 nm.

In an exemplary embodiment, a method of making the PbO/Co$_3$O$_4$/MgO nanocomposite material is described. The method includes adding a tartaric acid solution to a solution of magnesium nitrate hexahydrate (Mg(NO$_3$)$_2$·6H$_2$O), cobalt acetate tetrahydrate (Co(CH$_3$COO)$_2$·4H$_2$O), and lead nitrate (Pb(NO$_3$)$_2$) under stirring to form a reaction mixture, adding polyethylene glycol 400 to the reaction mixture to form a stabilized mixture and stirring at 250° C. until complete evaporation of water, forming a solid, and calcining the solid at a temperature in a range from 550 to 650° C. for 2 to 4 hours to form the PbO/Co$_3$O$_4$/MgO nanocomposite material.

In some embodiments, the solid is calcined at a temperature in a range from 575 to 625° C. for 2 to 4 hours to form the PbO/Co$_3$O$_4$/MgO nanocomposite material.

In some embodiments, the solid is calcined at 600° C. for 3 hours to form the PbO/Co$_3$O$_4$/MgO nanocomposite material.

In some embodiments, the concentration of tartaric acid in the reaction mixture is in a range from 120 to 140 g/L.

In some embodiments, the concentration of Mg(NO$_3$)$_2$·6H$_2$O in the reaction mixture is in a range from 75 to 85 g/L.

In some embodiments, the concentration of Co(CH$_3$COO)$_2$·4H$_2$O in the reaction mixture is in a range from 75 to 85 g/L.

In some embodiments, the concentration of Pb(NO$_3$)$_2$ in the reaction mixture is in a range from 75 to 85 g/L.

In some embodiments, the concentration of tartaric acid in the reaction mixture is in a range from 130 to 135 g/L, the concentration of Mg(NO$_3$)$_2$·6H$_2$O in the reaction mixture is in a range from 79 to 81 g/L, the concentration of Co(CH$_3$COO)$_2$·4H$_2$O in the reaction mixture is in a range from 79 to 81 g/L, and the concentration of Pb(NO$_3$)$_2$ in the reaction mixture is in a range from 79 to 81 g/L.

In some embodiments, the concentration of polyethylene glycol 400 in the stabilized mixture is in a range from 50 to 60 ml per liter of stabilized solution.

In some embodiments, the concentration of polyethylene glycol 400 in the stabilized mixture is in a range from 55 to 58 ml per liter of stabilized mixture.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
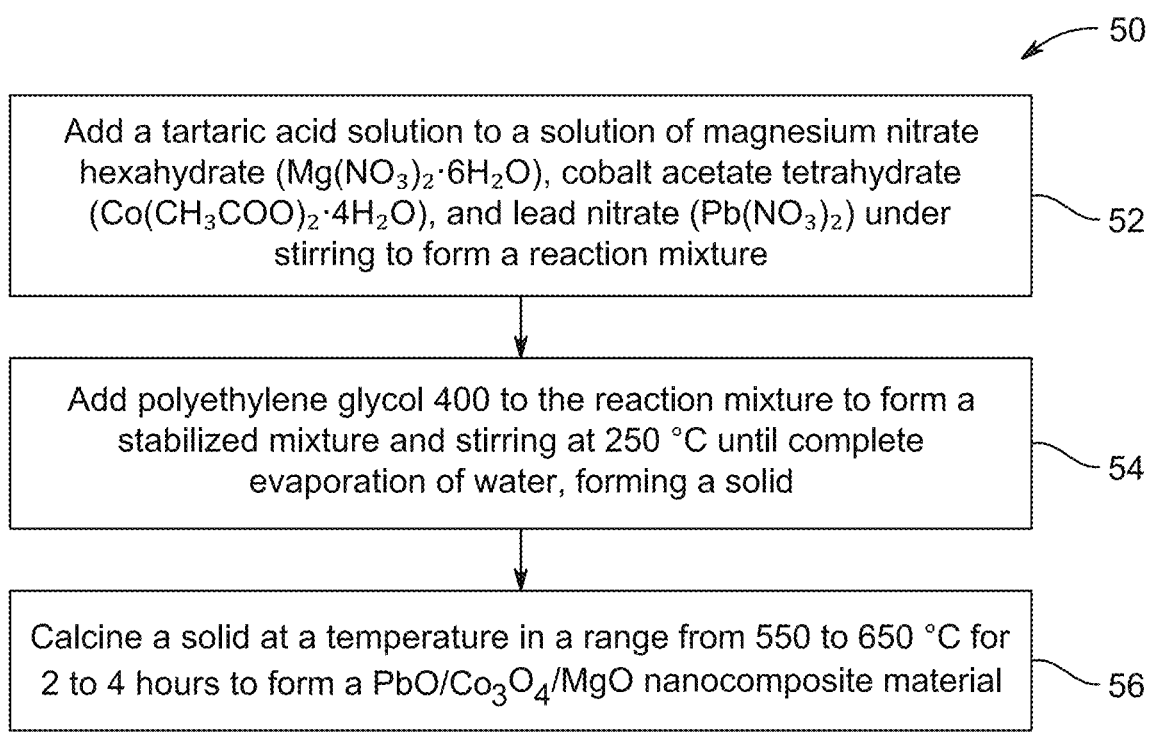
FIG. 1A is a method flowchart for making a PbO/Co$_3$O$_4$/MgO nanocomposite material, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'nanocomposite' refers to a material composed of at least two different components: a matrix and nanoparticles that are incorporated into or dispersed within the matrix. The nanoparticles typically have at least one dimension in the nanometre range (typically 1 to 100 nm) and are used to enhance or modify the properties of the matrix material. Nanocomposites can exhibit unique mechanical, electrical, thermal, optical, or chemical properties that are distinct from those of the individual components. The matrix can be made from various materials such as polymers, metals, ceramics, or carbon-based substances, while the nanoparticles can be made of metals, metal oxides, ceramics, carbon nanotubes, or other nanomaterials.

As used herein, the term 'average crystallite size' refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometres and reflects the typical dimensions of the crystalline regions in the material, excluding any amorphous regions or defects.

As used herein, the term 'atomic concentration' refers to the proportion or percentage of a specific element in a material, calculated based on the number of atoms of that element relative to the total number of atoms present in the material. It is typically expressed as a percentage (at. %) or as an atomic fraction. Atomic concentration provides insight into the composition of the material, reflecting the relative abundance of a particular element within a mixture or compound. This measurement is often determined using techniques such as X-ray fluorescence (XRF), energy-dispersive X-ray spectroscopy (EDS), or inductively coupled plasma mass spectrometry (ICP-MS).

As used herein, the term 'room temperature' refers to a temperature range of 23 degrees Celsius (° C.)±2° C. in the present disclosure. As used herein, 'ambient conditions' means the temperature and pressure of the surroundings in which the substance, composition or article is located.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, including for crystalline materials.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term 'median volume particle size (Dv50)' refers to the maximum particle diameter below which 50% of the sample volume exists. Unless otherwise indicated the Dv50 shall have the standard definition as per ISO guidelines.

As used herein, the term 'pore diameter' refers to pore size of nanocomposite material based on pore classification of the International Union of Pure and Applied Chemistry (IUPAC). The size measurement and nomenclature such as mesopores, micropores, or macropores will be applicable wherever necessary accordingly unless otherwise indicated in the disclosure.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

In addition, the present disclosure is intended to include all isotopes of atoms occurring in the present compounds and complexes. Isotopes include those atoms having the same atomic number but different mass numbers.

Aspects of the present disclosure are directed to a PbO/$Co_3O_4$/MgO nanocomposite fabricated using the Pechini sol-gel method. The nanocomposite of the present disclosure combines the advantages of each component of the multi-component nanocomposite, thereby offering enhanced physical and chemical properties for catalysis and environmental remediation.

A PbO/$Co_3O_4$/MgO nanocomposite material (also referred to as a nanocomposite) is described. The nanocomposite may include crystalline phases, but is not limited to quartz, calcite, hematite, magnetite, goethite, dolomite, albite, anorthite, pyrite, fluorite, halite, barite, apatite, rutile, and zircon. In a preferred embodiment, the PbO/$Co_3O_4$/MgO nanocomposite exhibits an orthorhombic PbO crystalline phase, a cubic $Co_3O_4$ crystalline phase, and a cubic MgO crystalline phase.

In some embodiments, the average crystallite size of the PbO/$Co_3O_4$/MgO nanocomposite material is within the range of 25 to 200 nm, 50 to 150 nm, preferably 75 to 90 nm, including subranges such as 75-76, 76-77, 77-78, 78-79, 79-80, 80-81, 81-82, 82-83, 83-84, 84-85, 85-86, 86-87, 87-88, 88-89, 89-90, 75-77, 76-78, 77-79, 78-80, 79-81, 80-82, 81-83, 82-84, 83-85, 84-86, 85-87, 86-88, 87-89, 88-90, 75-80 nm. Broader ranges include 75-80 nm, 80-85 nm, 85-90 nm, 75-85 nm, 80-90 nm, 75-90 nm, along with finer intervals such as 75-77.5 nm, 77.5-80 nm, 80-82.5 nm, 82.5-85 nm, 85-87.5 nm, 87.5-90 nm. In a preferred embodiment, the average crystallite size is 82.19 nm.

In some embodiments, the atomic concentration of lead in the PbO/$Co_3O_4$/MgO nanocomposite material ranges from 1 to 30 at. %, 5 to 20 at. %, preferably 8 to 15 at. %, including 8-9 at. %, 9-10 at. %, 10-11 at. %, 11-12 at. %, 12-13 at. %, 13-14 at. %, 14-15 at. %, 8-10 at. %, 9-11 at. %, 10-12 at. %, 11-13 at. %, 12-14 at. %, 13-15 at. %, 8-11 at. %, 9-12 at. %, 10-13 at. %, 11-14 at. %, 12-15 at. %, 8-12 at. %, 9-13 at. %, 10-14 at. %, 11-15 at. %, 8-13 at. %, 9-14 at. %, 10-15 at. %, 8-14 at. %, 9-15 at. %, 8-15 at. %, 8.5-10 at. %, 10.5-12.5 at. %. In a preferred embodiment, the atomic concentration of lead in the PbO/$Co_3O_4$/MgO nanocomposite material is 11.50 at. %.

In some embodiments, the atomic concentration of magnesium in the PbO/$Co_3O_4$/MgO nanocomposite material ranges from 1 to 40 at. %, 5 to 30 at. %, preferably 14 to 22 at. %, with subranges such as 14-15 at. %, 15-16 at. %, 16-17 at. %, 17-18 at. %, 18-19 at. %, 19-20 at. %, 20-21 at. %, 21-22 at. %, 14-16 at. %, 15-17 at. %, 16-18 at. %, 17-19 at. %, 18-20 at. %, 19-21 at. %, 20-22 at. %, 14-17 at. %, 15-18 at. %, 16-19 at. %, 17-20 at. %, 18-21 at. %, 19-22 at. %, 14-18 at. %, 15-19 at. %, 16-20 at. %, 17-21 at. %, 18-22 at. %, 14-19 at. %, 15-20 at. %, 16-21 at. %, 17-22 at. %. In a preferred embodiment, the atomic concentration of magnesium is 17.80 at. %.

In some embodiments, the atomic concentration of cobalt in the PbO/$Co_3O_4$/MgO nanocomposite material ranges from 1 to 40 at. %, 5 to 30 at. %, preferably 15 to 25 at. %, with subranges such as 15-16 at. %, 16-17 at. %, 17-18 at. %, 18-19 at. %, 19-20 at. %, 20-21 at. %, 21-22 at. %, 22-23 at. %, 23-24 at. %, 24-25 at. %, 15-17 at. %, 16-18 at. %, 17-19 at. %, 18-20 at. %, 19-21 at. %, 20-22 at. %, 21-23 at. %, 22-24 at. %, 23-25 at. %, 15-18 at. %, 16-19 at. %, 17-20 at. %, 18-21 at. %, 19-22 at. %, 20-23 at. %, 21-24 at. %, 22-25 at. %, 15-19 at. %, 16-20 at. %, 17-21 at. %. In a preferred embodiment, the atomic concentration of cobalt is 20.00 at. %.

In some embodiments, the atomic concentration of oxygen in the PbO/$Co_3O_4$/MgO nanocomposite material ranges from 20 to 80 at. %, 30 to 70 at. %, preferably 40 to 60 at. %, including 40-41 at. %, 41-42 at. %, 42-43 at. %, 43-44 at. %, 44-45 at. %, 45-46 at. %, 46-47 at. %, 47-48 at. %, 48-49 at. %, 49-50 at. %, 50-51 at. %, 51-52 at. %, 52-53 at. %, 53-54 at. %, 54-55 at. %, 55-56 at. %, 56-57 at. %, 57-58 at. %, 58-59 at. %, 59-60 at. %, 40-42 at. %, 41-43 at. %, 42-44 at. %, 43-45 at. %, 44-46 at. %, 45-47 at. %, 46-48 at. %, 47-49 at. %, 48-50 at. %, 49-51 at. %. In a preferred embodiment, the atomic concentration of oxygen in the PbO/$Co_3O_4$/MgO nanocomposite material is 50.70 at. %.

In some embodiments, the morphology of the nanocomposite material includes diverse nanostructures such as nanowires, nanospheres, nanosheets, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures. In a preferred embodiment, the nanocomposite material exhibits a heterogenous structure including rod-like particles and agglomerations of spherical particles.

In some embodiments, the rod-like particles have an average length ranging from 0.5 to 10 μm, 1.0 to 5.0 μm, preferably 1.0 to 5.0 μm, with specific ranges including 0.5-1.0 μm, 1.0-1.5 μm, 1.5-2.0 μm, 2.0-2.5 μm, 2.5-3.0 μm, 3.0-3.5 μm, 3.5-4.0 μm, 4.0-4.5 μm, 4.5-5.0 μm, 5.0-5.5 μm, 5.5-6.0 μm, 6.0-6.5 μm, 6.5-7.0 μm, 7.0-7.5 μm, 7.5-8.0 μm, 8.0-8.5 μm, 8.5-9.0 μm, 9.0-9.5 μm, 9.5-10.0 μm, 0.5-1.5 μm, 1.0-2.0 μm, 1.5-2.5 μm, 2.0-3.0 μm, 2.5-3.5 μm, 3.0-4.0 μm, 3.5-4.5 μm, 4.0-5.0 μm, 4.5-5.5 μm, and 5.0-6.0 μm. In some embodiments, the rod-like particles have an average diameter in a range from 0.25 to 4 μm, 0.25 to 2.0 μm, preferably 0.5 to 1.5 μm with specific ranges including 0.25-0.5 μm, 0.5-0.75 μm, 0.75-1.0 μm, 1.0-1.25 μm, 1.25-1.5 μm, 1.5-1.75 μm, 1.75-2.0 μm, 2.0-2.25 μm, 2.25-2.5

μm, 2.5-2.75 μm, 2.75-3.0 μm, 3.0-3.25 μm, 3.25-3.5 μm, 3.5 to 3.75 μm, 3.75 to 4.0 μm, 0.5-1.0 μm, 1.0-1.5 μm, and 1.5-2 μm.

In some embodiments, the spherical particles have an average diameter in the range of 10 to 300 nm, 25 to 200 nm, preferably 25 to 100 nm, with specific ranges including 10-20 nm, 20-30 nm, 30-40 nm, 40-50 nm, 50-60 nm, 60-70 nm, 70-80 nm, 80-90 nm, 90-100 nm, 100-110 nm, 110-120 nm, 120-130 nm, 130-140 nm, 140-150 nm, 150-160 nm, 160-170 nm, 170-180 nm, 180-190 nm, 190-200 nm, 200-210 nm, 210-220 nm, 220-230 nm, 230-240 nm, 240-250 nm, 250-260 nm, 260-270 nm, 270-280 nm, 280-290 nm, 290-300 nm, and 10-30 nm.

FIG. 1A illustrates a schematic flow chart of a method 50 of preparing the $PbO/Co_3O_4/MgO$ nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding a tartaric acid solution to a solution of magnesium nitrate hexahydrate $(Mg(NO_3)_2 \cdot 6H_2O)$, cobalt acetate tetrahydrate $(Co(CH_3COO)_2 \cdot 4H_2O)$, and lead nitrate $(Pb(NO_3)_2)$ under stirring to form a reaction mixture. In some embodiments, magnesium salt may include, but is not limited to, magnesium chloride, magnesium sulfate, magnesium carbonate, magnesium oxide (MgO), magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate (anhydrous), magnesium formate, magnesium acetate (anhydrous), magnesium hypophosphite, magnesium tungstate, magnesium thiosulfate, magnesium nitride, magnesium aluminate, and magnesium succinate. In a preferred embodiment, the magnesium salt is magnesium nitrate hexahydrate $(Mg(NO_3)_2 \cdot 6H_2O)$.

In some embodiments, cobalt salt may include, but is not limited to, cobalt chloride, cobalt sulfate, cobalt nitrate, cobalt carbonate, cobalt oxide, cobalt hydroxide, cobalt bromide, cobalt iodide, cobalt fluoride, cobalt acetate (anhydrous), cobalt citrate, cobalt malate, cobalt gluconate, cobalt tartrate, cobalt phosphate, cobalt pyrophosphate, cobalt silicate, cobalt stearate, cobalt perchlorate, cobalt thiocyanate, cobalt thiophosphate, cobalt oxalate, cobalt chlorate, cobalt hypophosphite, cobalt formate, cobalt aluminate, cobalt tungstate, cobalt molybdate, cobalt selenate, and cobalt chromate. In a preferred embodiment, the cobalt salt is cobalt acetate tetrahydrate $(Co(CH_3COO)_2 \cdot 4H_2O)$ In some embodiments, lead salt may include, but is not limited to, lead sulfate, lead chloride, lead acetate, lead carbonate, lead oxide, lead bromide, lead iodide, lead formate, lead phosphate, lead lactate, lead citrate, lead tartrate, lead malate, lead stearate, lead oxalate, lead acetate tetrahydrate, lead chloride hexahydrate, lead formate tetrahydrate, lead aluminate, lead silicate, lead bromate, lead iodate, lead hydroxide, lead sulfide, lead chromate, lead nitrate hexahydrate, lead bromide hydrate, lead nitrate tetrahydrate, and lead ferrite. The lead salt is selected from the group consisting of lead sulfate, lead nitrate, lead chloride and lead acetate. In a preferred embodiment, the lead salt is lead nitrate.

In some embodiments, tartaric acid is used as a chelating agent. Tartaric acid includes natural and commercial forms of the acid. In some embodiments, tartaric acid is D-tartaric acid, L-tartaric acid, achiral tartaric acid or racemic mixture of D- and L-tartaric acid forms. In alternate embodiments, at least one hydroxyalkyl carboxylic acid selected from the group consisting of citric acid, tartaric acid, malic acid, mandelic acid and 12-hydroxystearic acid can also be used be used as a chelating agent. In some embodiments, the chelating agent is a combination of citric acid, tartaric acid, malic acid, mandelic acid and 12-hydroxystearic acid or variations of one or more hydroxyalkyl carboxylic acids.

In some embodiments, the chelating agent is selected from a group consisting of one or more of isosteric acid, isocitric acid, aconitic acid, tricarboxylic acid, carboxylic acid, dicarboxylic acid, tricarboxylic acid, aminopolycarboxylic acid and polycarboxylic acid. In some embodiments, the carboxylic acid includes saturated dicarboxylic acids and unsaturated dicarboxylic acids. In some embodiments, the saturated dicarboxylic acids include adipic acid, and succinic acid. The unsaturated dicarboxylic acids include fumaric acid, glutaconic acid, muconic acid, and citraconic acid. In some embodiments, the chelating agent are one or more of disodium edetate, trisodium edetate, sodium citrate, sodium tartarate, lactic acid, sodium polyphosphate, sodium metaphosphate or gluconic acid, and salicylic acid.

In some embodiments, the concentration of the tartaric acid in the reaction mixture may range from 100 to 160 g/L, 130 to 150 g/L, preferably 120 to 140 g/L, including 120.0-122.0, 121.0-123.0, 122.0-124.0, 123.0-125.0, 124.0-126.0, 125.0-127.0, 126.0-128.0, 127.0-129.0, 128.0-130.0, 129.0-131.0, 130.0-132.0, 131.0-133.0, 132.0-134.0, 133.0-135.0, 134.0-136.0, 135.0-137.0, 136.0-138.0, 137.0-139.0, 138.0-140.0, 120.5-122.5, 121.5-123.5, 122.5-124.5, 123.5-125.5, 124.5-126.5, 125.5-127.5, 126.5-128.5, 127.5-129.5, 128.5-130.5, 129.5-131.5, 130.5-132.5 g/L. In a preferred embodiment, the concentration of the tartaric acid in the reaction mixture is 135 g/L.

In some embodiments, the concentration of magnesium nitrate hexahydrate in the reaction mixture may range from 55 to 105 g/L, 65 to 95 g/L, preferably 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 79.5-81 g/L, 81-82.5 g/L, 82.5-84 g/L, 75-78 g/L, 78-81 g/L, 81-84 g/L, 75-82 g/L, 76-83 g/L, 77-84 g/L, and 78-85 g/L. In a preferred embodiment, the concentration of magnesium nitrate hexahydrate in the reaction mixture is 75 g/L.

In some embodiments, the concentration of cobalt acetate tetrahydrate in the reaction mixture may range from 55 to 105 g/L, 65 to 95 g/L, preferably 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 79.5-81 g/L, 81-82.5 g/L, 82.5-84 g/L, 75-78 g/L, 78-81 g/L, 81-84 g/L, 75-82 g/L, 76-83 g/L, 77-84 g/L, and 78-85 g/L. In a preferred embodiment, the concentration of cobalt acetate tetrahydrate in the reaction mixture is 75 g/L.

In some embodiments, the concentration of lead nitrate in the reaction mixture may range from 55 to 105 g/L, 65 to 95 g/L, preferably 75 to 85 g/L, including 75-76 g/L, 76-77 g/L, 77-78 g/L, 78-79 g/L, 79-80 g/L, 80-81 g/L, 81-82 g/L, 82-83 g/L, 83-84 g/L, 84-85 g/L, 75-77 g/L, 77-79 g/L, 79-81 g/L, 81-83 g/L, 83-85 g/L, 75-80 g/L, 80-85 g/L, 75-76.5 g/L, 76.5-78 g/L, 78-79.5 g/L, 79.5-81 g/L, 81-82.5 g/L, 82.5-84 g/L, 75-78 g/L, 78-81 g/L, 81-84 g/L, 75-82 g/L, 76-83 g/L, 77-84 g/L, and 78-85 g/L. In a preferred embodiment, the concentration of lead nitrate in the reaction mixture is 75 g/L.

In some embodiments, the tartaric acid solution was added to the aqueous solution with continuous stirring for a duration ranging from 1 min to 100 min, 5 min to 80 min, 10 min to 60 min, including 10-11 min, 11-12 min, 12-13 min, 13-14 min, 14-15 min, 15-16 min, 16-17 min, 17-18 min, 18-19 min, 19-20 min, 20-21 min, 21-22 min, 22-23 min, 23-24 min, 24-25 min, 25-26 min, 26-27 min, 27-28 min, 28-29 min, 29-30 min, 30-31 min, 31-32 min, 32-33 min, 33-34 min, 34-35 min, 35-36 min, 36-37 min, 37-38 min, 38-39 min, 39-40 min. In a preferred embodiment, the tartaric acid solution was added to the metal nitrate solution with continuous stirring for 30 min.

At step 52, the method 50 includes adding polyethylene glycol 400 to the reaction mixture to form a stabilized mixture and stirring at 250° C. until complete evaporation of water, forming a solid. In some embodiments, the polyethylene glycol 400 is added in a dropwise manner into the aqueous mixture. The method allows for control resulting in functional diversity and stability of the nanocomposite material.

In some embodiments, the concentration of polyethylene glycol 400 in the stabilized mixture ranges from 10 to 100 mL/L, 20 to 80 mL/L, preferably 50 to 60 mL/L, including 50-51 mL/L, 51-52 mL/L, 52-53 mL/L, 53-54 mL/L, 54-55 mL/L, 55-56 mL/L, 56-57 mL/L, 57-58 mL/L, 58-59 mL/L, 59-60 mL/L, 50-52 mL/L, 52-54 mL/L, 54-56 mL/L, 56-58 mL/L, 58-60 mL/L, 50-55 mL/L, 55-60 mL/L, 50-51.5 mL/L, 51.5-53 mL/L, 53-54.5 mL/L, 54.5-56 mL/L, 56-57.5 mL/L, 57.5-59 mL/L, 50-53 mL/L, 53-56 mL/L, 56-59 mL/L, 50-54 mL/L, 54-57 mL/L, 57-60 mL/L. In the preferred embodiment, the concentration of polyethylene glycol 400 in the stabilized mixture is 56 mL/L.

At step 52, the method 50 includes calcining the solid at a temperature in a range from 500 to 700° C., preferably 550 to 650° C. for 2 to 4 hours to form the $PbO/Co_3O_4/MgO$ nanocomposite material. In some embodiments, the solid is calcined at a temperature ranging from 575 to 625° C., including 575-576° C., 576-577° C., 577-578° C., 578-579° C., 579-580° C., 580-581° C., 581-582° C., 582-583° C., 583-584° C., 584-585° C., 585-586° C., 586-587° C., 587-588° C., 588-589° C., 589-590° C., 590-591° C., 591-592° C., 592-593° C., 593-594° C., 594-595° C., 595-596° C., 596-597° C., 597-598° C., 598-599° C., 599-600° C., 600-601° C., 601-602° C., 602-603° C., 603-604° C., 604-605° C. to form the $PbO/Co_3O_4/MgO$ nanocomposite material. In a preferred embodiment, the solid is calcined at 600° C. to form the $PbO/Co_3O_4/MgO$ nanocomposite material.

In some embodiments, the solid is calcined for a duration ranging from 1 to 10 hours, preferably 2 to 4 hours, including 2-2.1 hours, 2.1-2.2 hours, 2.2-2.3 hours, 2.3-2.4 hours, 2.4-2.5 hours, 2.5-2.6 hours, 2.6-2.7 hours, 2.7-2.8 hours, 2.8-2.9 hours, 2.9-3 hours, 3-3.1 hours, 3.1-3.2 hours, 3.2-3.3 hours, 3.3-3.4 hours, 3.4-3.5 hours, 3.5-3.6 hours, 3.6-3.7 hours, 3.7-3.8 hours, 3.8-3.9 hours, 3.9-4 hours, 2-2.5 hours, 2.5-3 hours, 3-3.5 hours, 3.5-4 hours, 2-3 hours, 3-4 hours, 2.1-2.6 hours, 2.6-3.1 hours, 3.1-3.6 hours, 2.2-3.2 hours to form the $PbO/Co_3O_4/MgO$ nanocomposite material. In a preferred embodiment, the solid is calcined for 3 hours to form the $PbO/Co_3O_4/MgO$ nanocomposite material.

EXAMPLES

The following examples demonstrate a $PbO/Co_3O_4/MgO$ nanocomposite material. The examples are provided solely for illustration and are not to be construed as limitations of the present disclosure, as many variations thereof are possible without departing from the spirit and scope of the present disclosure.

Figure 1B:
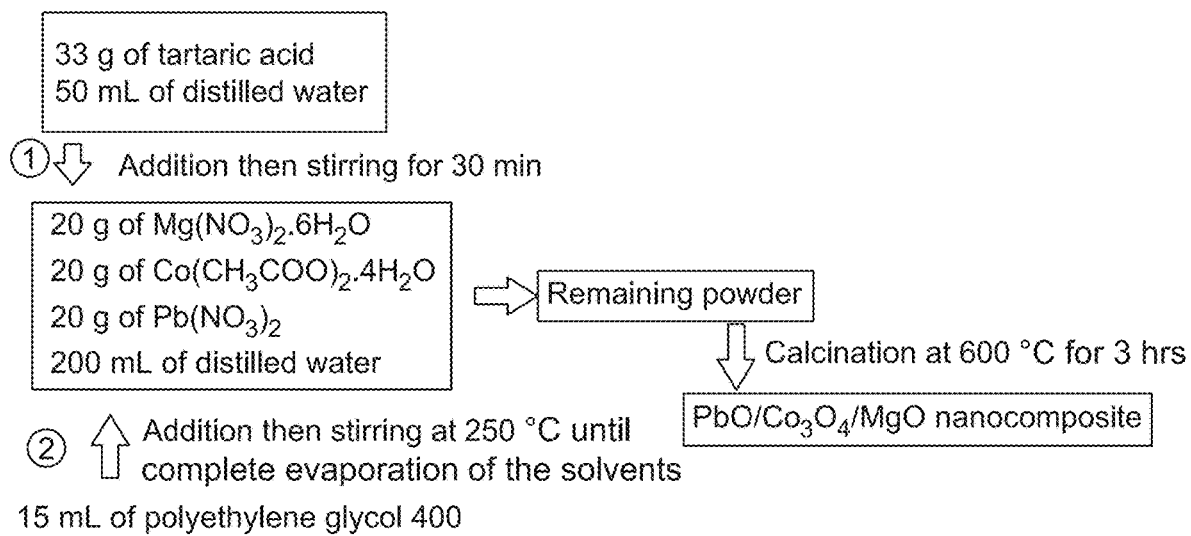
FIG. 1B shows experimental steps for the production of the PbO/Co$_3$O$_4$/MgO material, according to certain embodiments.

Example 1: Synthesis of $PbO/Co_3O_4/MgO$ Nanocomposite Material Using Pechini Sol-Gel Method The $PbO/Co_3O_4/MgO$ nanocomposite material was synthesized using the Pechini sol-gel method, as illustrated in FIG. 1B. Initially, 33 g of tartaric acid was dissolved in 50 mL of distilled water. In a separate step, 20 g of magnesium nitrate hexahydrate ($Mg(NO_3)_2 \cdot 6H_2O$), 20 g of cobalt acetate tetrahydrate ($Co(CH_3COO)_2 \cdot 4H_2O$), and 20 g of lead nitrate ($Pb(NO_3)_2$) were dissolved in 200 mL of distilled water. The tartaric acid solution was then gradually added to the metal solution with continuous stirring for 30 min. Subsequently, 15 mL of polyethylene glycol 400 was added to the mixture by stirring at 250° C. until complete evaporation of solvents occurred. The resulting solid was collected and calcinated at 600° C. for 3 hrs to obtain the $PbO/Co_3O_4/MgO$ nanocomposite material.

Figure 2:
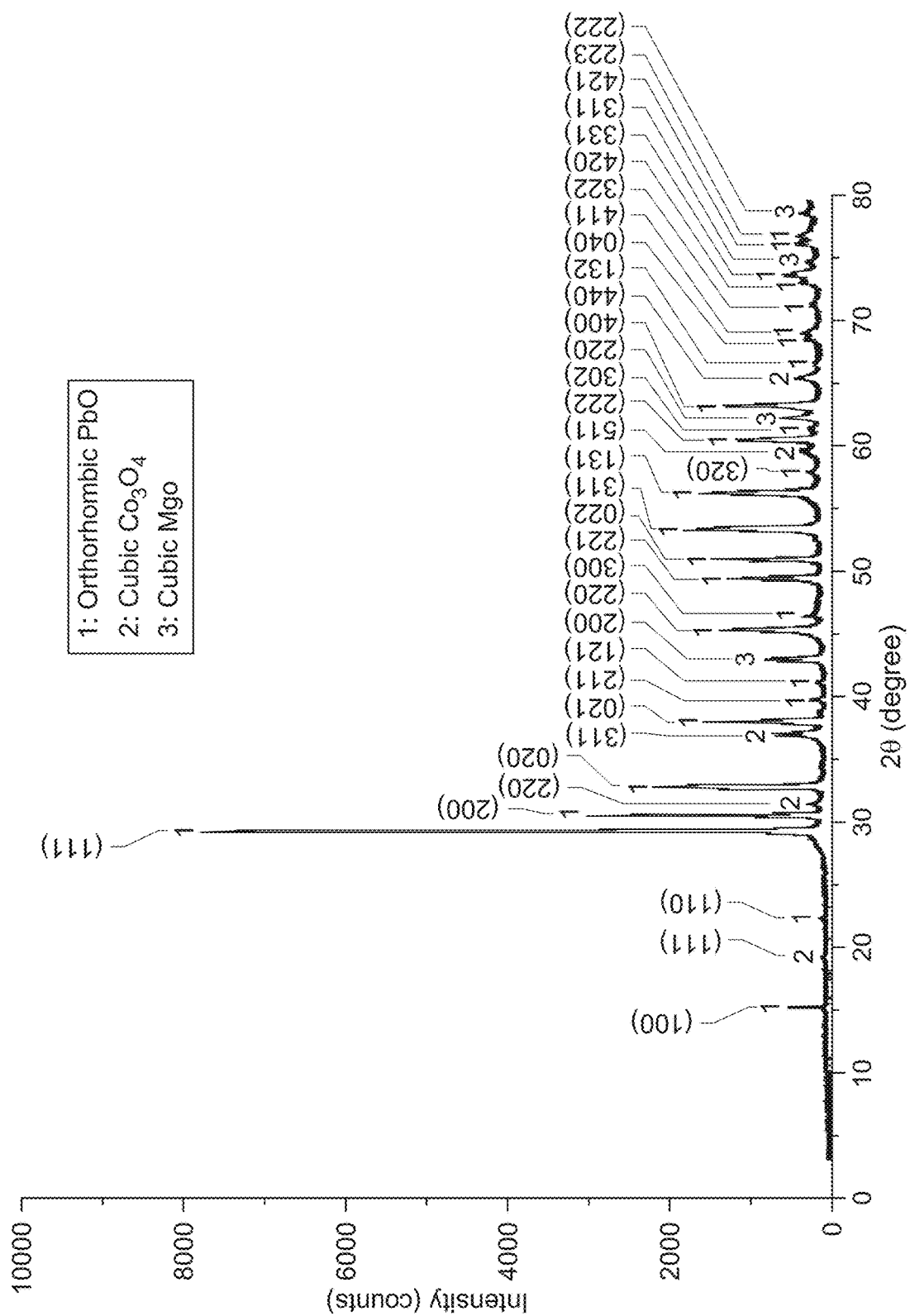
FIG. 2 illustrates X-ray diffraction (XRD) pattern of the PbO/Co$_3$O$_4$/MgO nanocomposite material, according to certain embodiments.

The X-ray diffraction (XRD) pattern of the $PbO/Co_3O_4/MgO$ nanocomposite material, as shown in FIG. 2, demonstrates the crystallographic properties of its components, namely lead oxide (PbO), cobalt oxide ($CO_3O_4$), and magnesium oxide (MgO). The structural data, as summarized in Table 1, reveal that PbO corresponds to an orthorhombic crystal system with card number JCPDS-01-072-0093, $Co_3O_4$ to a cubic crystal system with card number JCPDS-01-078-1970, and MgO to a cubic crystal system with card number JCPDS-01-071-1176. The average crystallite size of the synthesized nanocomposite is 82.19 nm. The 2θ angles for orthorhombic PbO are 15.19, 22.16, 29.14, 30.50, 32.75, 37.86, 39.59, 40.98, 45.21, 46.33, 49.32, 50.95, 53.31, 56.17, 57.79, 60.41, 61.28, 63.16, 66.52, 68.39, 69.01, 71.26, 72.99, 73.63, 75.98, and 76.74, and their corresponding Miller indices are (100), (110), (111), (200), (020), (021), (211), (121), (220), (300), (221), (022), (311), (131), (320), (222), (302), (400), (132), (040), (411), (322), (420), (331), (421), and (223). For cubic $Co_3O_4$, the 2θ angles are 19.04, 31.39, 36.98, 59.42, and 65.39, and their corresponding Miller indices are (111), (220), (311), (511), and (440). For cubic MgO, the 2θ angles are 42.98, 62.28, 74.49, and 78.48, and their corresponding Miller indices are (200), (220), (311), and (222). These data confirm the crystalline phases and crystal systems of the synthesized nanocomposite components.

TABLE 1

Components of synthesized nanocomposite

| | Components of synthesized nanocomposite | | | Average crystallite size of the nanocomposite (nm) |
|---|---|---|---|---|
| Phase | Chemical name | Card No. | Crystal system | |
| PbO | Lead oxide | JCPDS-01-072-0093 | Orthorhombic | 82.19 |
| $Co_3O_4$ | Cobalt oxide | JCPDS-01-078-1970 | Cubic | |
| MgO | Magnesium oxide | JCPDS-01-071-1176 | Cubic | |

Figure 3:
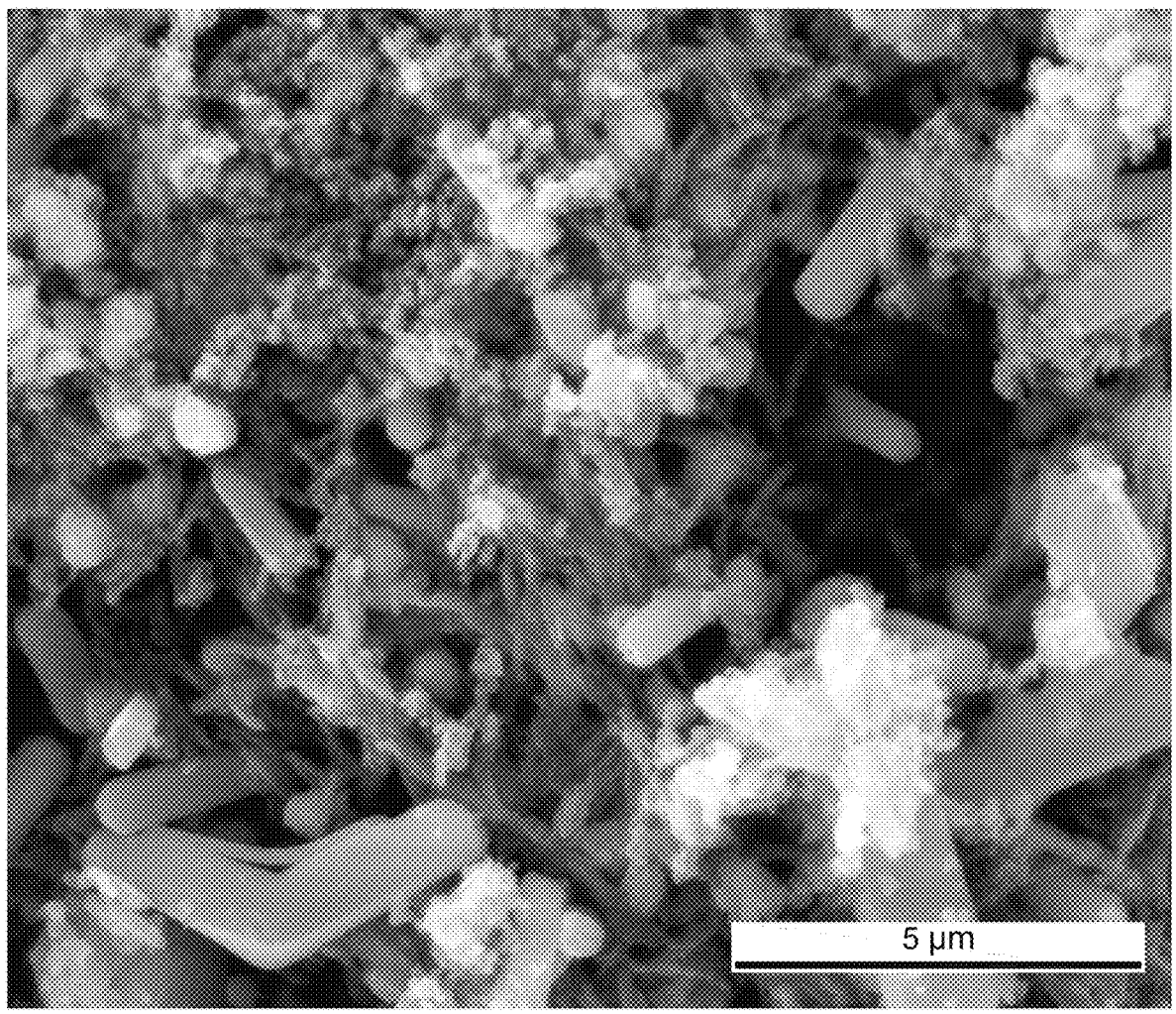
FIG. 3 shows a scanning electron microscope (SEM) image of the PbO/Co$_3$O$_4$/MgO nanocomposite material, according to certain embodiments.

The scanning electron microscope (SEM) image of the PbO/Co$_3$O$_4$/MgO nanocomposite material, as shown in FIG. 3, reveals a heterogeneous microstructure with various morphologies. The image highlights rod-like structures, irregularly shaped particles, and some agglomerated regions, indicative of the composite's complex and multi-component nature. The rod-like structures are elongated and uniform, while the irregular particles appear as clusters, suggesting diverse active sites. The morphology supports the effectiveness of the nanocomposite for adsorption or catalytic applications, as the mixed shapes can enhance physical and chemical interactions in potential applications.

Figure 4:
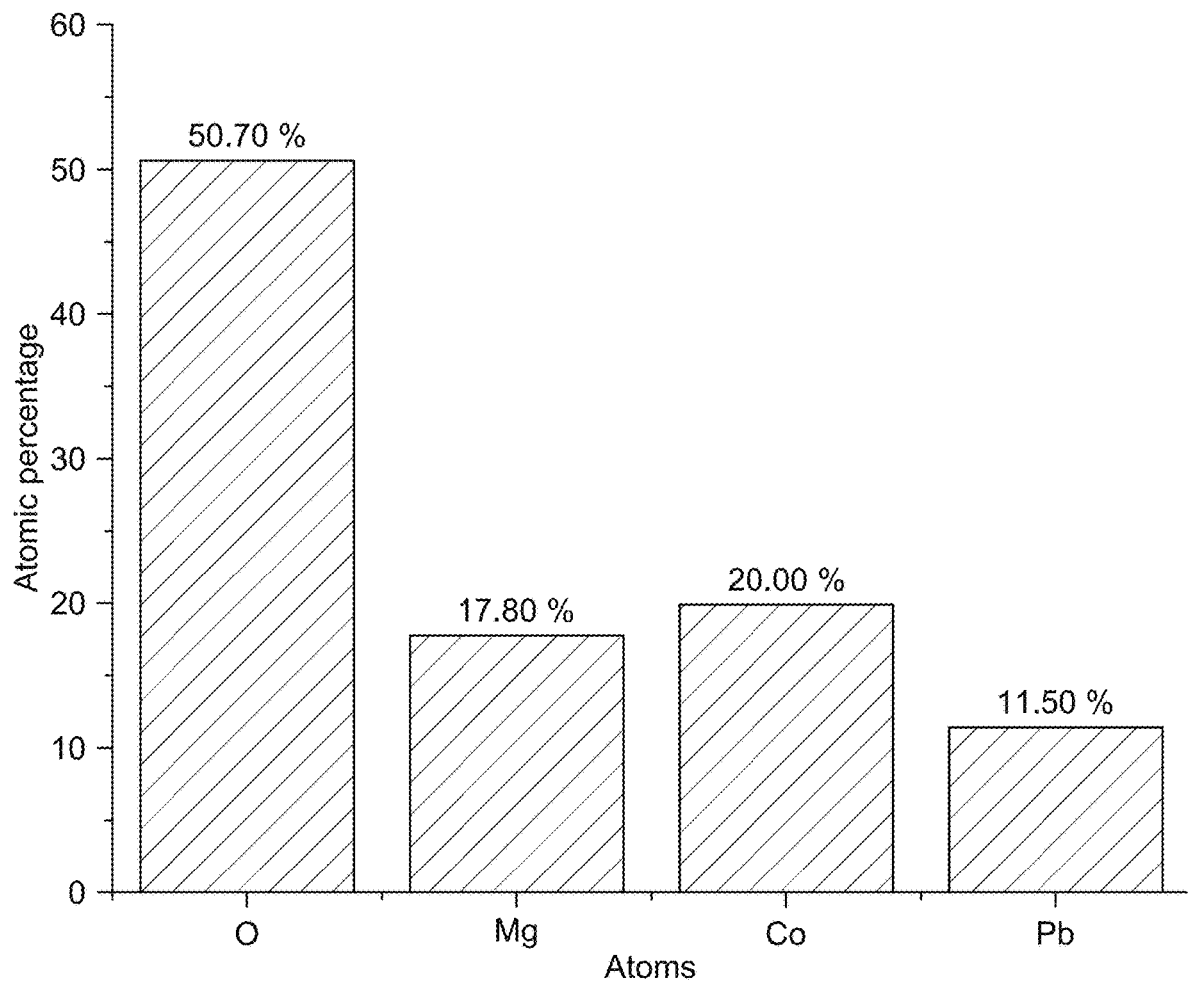
FIG. 4 is a graph showing the atomic percentage distribution of elements in the PbO/Co$_3$O$_4$/MgO nanocomposite material, as determined by energy-dispersive X-ray spectroscopy (EDX) analysis, according to certain embodiments.

FIG. 4 illustrates the atomic percentage distribution of elements in the synthesized nanocomposite as determined by energy dispersive x-ray spectroscopy (EDX). The results reveal that oxygen (O) constitutes the majority of the composition with an atomic percentage of 50.70 at. %, followed by cobalt (Co) at 20.00 at. %, magnesium (Mg) at 17.80 at. %, and lead (Pb) at 11.50 at. %. This elemental distribution indicates the successful incorporation of these elements in the nanocomposite. The high oxygen content reflects the oxide-based nature of the composite, while the proportions of cobalt, magnesium, and lead are consistent with their presence as major components in the multi-phase structure. These findings confirm the synthesis and composition of the PbO/Co$_3$O$_4$/MgO nanocomposite material.

The composite's thermal stability and multi-phase composition position it as an advanced material for use in adsorption, catalysis, and other high-performance applications across environmental and industrial sectors.

To summarize, the present disclosure involves the facile fabrication of the PbO/Co$_3$O$_4$/MgO nanocomposite material using the Pechini sol-gel method, representing an advancement in nanomaterial synthesis. The novelty lies in the synergistic integration of lead oxide, cobalt oxide, and magnesium oxide into a single composite with enhanced physical and chemical properties, making it suitable for applications in catalysis and environmental remediation. The X-ray diffraction (XRD) analysis confirms the crystalline nature of the nanocomposite with orthorhombic, cubic, and cubic phases corresponding to PbO, Co$_3$O$_4$, and MgO, respectively, and an average crystallite size of 82.19 nm. Scanning electron microscopy (SEM) reveals a heterogeneous microstructure featuring rod-like structures, irregularly shaped particles, and agglomerated regions, indicating a complex morphology that provides diverse active sites. Energy-dispersive X-ray spectroscopy (EDX) analysis demonstrates the successful incorporation of the elements with oxygen constituting 50.70 at. %, cobalt at 20.00 at. %, magnesium at 17.80 at. %, and lead at 11.50 at. %. These results underscore the composite's multi-component nature and validate its synthesis, positioning it as an innovative material with enhanced thermal stability, active site availability, and potential for advanced technological applications.

Numerous modifications and variations of the present disclosure are possible in light of the above teachings. It is, therefore, to be understood that within the scope of the appended claims, the invention may be practiced otherwise than as specifically described herein.

The invention claimed is:

1. A PbO/Co$_3$O$_4$/MgO nanocomposite material comprising:
   an orthorhombic PbO crystalline phase;
   a cubic Co$_3$O$_4$ crystalline phase; and
   a cubic MgO crystalline phase,
   wherein an average crystallite size of the PbO/Co$_3$O$_4$/MgO nanocomposite material is in a range from 75 to 90 nm.

2. The PbO/Co$_3$O$_4$/MgO nanocomposite material of claim 1, wherein the average crystallite size of the PbO/Co$_3$O$_4$/MgO nanocomposite material is in a range from 78 to 85 nm.

3. The PbO/Co$_3$O$_4$/MgO nanocomposite material of claim 2, wherein the average crystallite size of the PbO/Co$_3$O$_4$/MgO nanocomposite material is in a range from 81 to 83 nm.

4. The PbO/Co$_3$O$_4$/MgO nanocomposite material of claim 1, wherein the atomic concentration of lead in the PbO/Co$_3$O$_4$/MgO nanocomposite material is in a range from 8 to 15 at. %, the atomic concentration of cobalt in the PbO/Co$_3$O$_4$/MgO nanocomposite material is in a range from 15 to 25 at. %, and the atomic concentration of magnesium in the PbO/Co$_3$O$_4$/MgO nanocomposite material is in a range from 14 to 22 at. %.

5. The PbO/Co$_3$O$_4$/MgO nanocomposite material of claim 4, wherein the atomic concentration of lead in the PbO/Co$_3$O$_4$/MgO nanocomposite material is in a range from 10 to 13 at. %, the atomic concentration of cobalt in the PbO/Co$_3$O$_4$/MgO nanocomposite material is in a range from 18 to 22 at. %, and the atomic concentration of magnesium in the PbO/Co$_3$O$_4$/MgO nanocomposite material is in a range from 16 to 20 at. %.

6. The PbO/Co$_3$O$_4$/MgO nanocomposite material of claim 5, wherein the atomic concentration of lead in the PbO/Co$_3$O$_4$/MgO nanocomposite material is in a range from 11 to 12 at. %, the atomic concentration of cobalt in the PbO/Co$_3$O$_4$/MgO nanocomposite material is in a range from 19 to 21 at. %, and the atomic concentration of magnesium in the PbO/Co$_3$O$_4$/MgO nanocomposite material is in a range from 17 to 18.5 at. %.

7. The PbO/Co$_3$O$_4$/MgO nanocomposite material of claim 1, wherein the atomic concentration of oxygen in the PbO/Co$_3$O$_4$/MgO nanocomposite material is in a range from 40 to 60 at. %.

8. The PbO/Co$_3$O$_4$/MgO nanocomposite material of claim 1, wherein the PbO/Co$_3$O$_4$/MgO nanocomposite material comprises a heterogenous structure comprising:
   rod-like particles with an average length in a range from 0.5 to 10 μm and an average diameter in a range from 0.25 to 4 μm; and
   agglomerations of spherical particles wherein the spherical particles have an average diameter in a range from 10 to 300 nm.

9. The PbO/Co$_3$O$_4$/MgO nanocomposite material of claim 8, wherein the PbO/Co$_3$O$_4$/MgO nanocomposite material comprises a heterogenous structure comprising:
   rod-like particles with an average length in a range from 1 to 5 μm and an average diameter in a range from 0.25 to 2.0 μm; and
   agglomerations of spherical particles wherein the spherical particles have an average diameter in a range from 25 to 200 nm.

10. The PbO/Co$_3$O$_4$/MgO nanocomposite material of claim 9, wherein the PbO/Co$_3$O$_4$/MgO nanocomposite material comprises a heterogenous structure comprising:
    rod-like particles with an average length in a range from 1 to 3 μm and an average diameter in a range from 0.5 to 1.5 μm; and
    agglomerations of spherical particles wherein the spherical particles have an average diameter in a range from 25 to 100 nm.

11. A method for making the PbO/Co$_3$O$_4$/MgO nanocomposite material of claim 1, comprising:

adding a tartaric acid solution to a solution of magnesium nitrate hexahydrate (Mg(NO$_3$)$_2$·6H$_2$O), cobalt acetate tetrahydrate (Co(CH$_3$COO)$_2$·4H$_2$O), and lead nitrate (Pb(NO$_3$)$_2$) under stirring to form a reaction mixture;

adding polyethylene glycol 400 to the reaction mixture to form a stabilized mixture and stirring at 250° C. until complete evaporation of water, forming a solid; and calcining the solid at a temperature in a range from 550 to 650° C. for 2 to 4 hours to form the PbO/Co$_3$O$_4$/MgO nanocomposite material.

12. The method of claim 11, wherein the solid is calcined at a temperature in a range from 575 to 625° C. for 2 to 4 hours to form the PbO/Co$_3$O$_4$/MgO nanocomposite material.

13. The method of claim 11, wherein the solid is calcined at 600° C. for 3 hours to form the PbO/Co$_3$O$_4$/MgO nanocomposite material.

14. The method of claim 11, wherein the concentration of tartaric acid in the reaction mixture is in a range from 120 to 140 g/L.

15. The method of claim 11, wherein the concentration of Mg(NO$_3$)$_2$·6H$_2$O in the reaction mixture is in a range from 75 to 85 g/L.

16. The method of claim 11, wherein the concentration of Co(CH$_3$COO)$_2$·4H$_2$O in the reaction mixture is in a range from 75 to 85 g/L.

17. The method of claim 11, wherein the concentration of Pb(NO$_3$)$_2$ in the reaction mixture is in a range from 75 to 85 g/L.

18. The method of claim 11, wherein the concentration of tartaric acid in the reaction mixture is in a range from 130 to 135 g/L, the concentration of Mg(NO$_3$)$_2$·6H$_2$O in the reaction mixture is in a range from 79 to 81 g/L, the concentration of Co(CH$_3$COO)$_2$·4H$_2$O in the reaction mixture is in a range from 79 to 81 g/L, and the concentration of Pb(NO$_3$)$_2$ in the reaction mixture is in a range from 79 to 81 g/L.

19. The method of claim 11, wherein the concentration of polyethylene glycol 400 in the stabilized mixture is in a range from 50 to 60 ml per liter of stabilized solution.

20. The method of claim 11, wherein the concentration of polyethylene glycol 400 in the stabilized mixture is in a range from 55 to 58 ml per liter of stabilized mixture.

* * * * *